United States Patent [19]

Keys et al.

[11] Patent Number: 5,559,878
[45] Date of Patent: Sep. 24, 1996

[54] TELEPHONIC COMMUNICATIONS ANSWERING AND CALLBACK PROCESSING SYSTEM

[75] Inventors: Lyle O. Keys, Salt Lake City; Neil J. Gardner, Murray; Arthur C. Brunisholz; Richard R. Heath, both of Salt Lake City, all of Utah

[73] Assignee: Teltrust, Inc., Salt Lake City, Utah

[21] Appl. No.: 247,839

[22] Filed: May 23, 1994

[51] Int. Cl.⁶ .................................................. H04M 1/64
[52] U.S. Cl. .......................... 379/265; 379/309; 379/266; 379/209; 379/67
[58] Field of Search ...................... 379/265, 266, 379/309, 201, 216, 207, 214, 67, 209, 88, 89

[56] References Cited

U.S. PATENT DOCUMENTS

| | | | |
|---|---|---|---|
| 4,289,934 | 9/1981 | Pitroda et al. | 379/269 |
| 4,797,911 | 1/1989 | Szlam et al. | 379/216 |
| 4,800,583 | 1/1989 | Theis | 379/214 |
| 4,829,563 | 5/1989 | Crockett et al. | 379/216 |
| 4,894,857 | 1/1990 | Szlam et al. | 379/216 |
| 4,924,491 | 5/1990 | Compton et al. | 379/201 |
| 4,933,964 | 6/1990 | Girgis | 379/216 |
| 4,939,771 | 7/1990 | Brown et al. | 379/214 |
| 5,020,095 | 5/1991 | Morganstein et al. | 379/214 |
| 5,040,208 | 8/1991 | Jolissaint | 379/67 |
| 5,155,761 | 10/1992 | Hammond | 379/266 |
| 5,164,983 | 11/1992 | Brown et al. | 379/207 |
| 5,185,786 | 2/1993 | Zwick | 379/201 |
| 5,187,735 | 2/1993 | Herrero Garcia et al. | 379/212 |
| 5,214,688 | 5/1993 | Szlam et al. | 379/137 |
| 5,274,700 | 12/1993 | Gechter et al. | 379/201 |
| 5,282,243 | 1/1994 | Dabbaghi et al. | 379/201 |
| 5,295,184 | 3/1994 | Smith et al. | 379/216 |
| 5,311,574 | 5/1994 | Livanos | 379/266 |
| 5,311,583 | 5/1994 | Friedes et al. | 379/201 |
| 5,327,490 | 7/1994 | Cave | 379/216 |
| 5,327,491 | 7/1994 | Syu | 379/216 |
| 5,341,412 | 8/1994 | Ramot et al. | 379/216 |

OTHER PUBLICATIONS

Newton's Telecom Dictionary, 7th Ed., 1994 pp. 1134–1135.

*Primary Examiner*—Jeffery Hofsass
*Assistant Examiner*—Scott Wolinsky
*Attorney, Agent, or Firm*—Trask, Britt & Rossa

[57] ABSTRACT

A system and method for solving problems associated with limited attended answering of telephone calls during peak periods is provided. The system implements a method for controllably and responsively spreading telephone answering activity initiated during peak periods into the periods of lesser activity while maintaining a contact with callers who might otherwise hang-up and be lost. From a system point of view, the system uses a unique organization of commercially available equipment in combination with an original computer software package. The combination provides judicious automatic and unmanned intercession of telephone calls resident in an overflow "HOLD" queue, relieving a manned portion of the system from having to answer all calls during peak periods. Sufficient information is derived by automatic operation of the invention to permit manned call backs when time and equipment become available. The system selectively implements later manned call placement scheduling as personnel services become available for the call backs. All information necessary to return each incoming call is made available to system personnel on a call-by-call basis.

17 Claims, 14 Drawing Sheets

TELEPHONIC COMMUNICATIONS ANSWERING AND CALLBACK PROCESSING SYSTEM

FIELD OF INVENTION

This invention relates to high volume telephone answering systems and particularly to telephone answering systems which have intermittent periods of intense inbound calls due to mass advertising.

BACKGROUND

Inbound telemarketing is characterized by periods of high telephone activity interposed between relatively common periods of inactivity. Telephone calling activity is generally the result of appearance of a mass media (television or radio) commercial which provides a calling number (often a free call) along with an invitation to order merchandise or services. Important to the telemarketing business is a ready response to each potential customer. For this reason, difficulties related to inadequate resources of personnel and equipment have a dramatic effect upon telemarketing profits. Due to the intermittent characteristics of the business, it is impractical to staff for peak activity periods while affording impractical periods of inactivity.

One solution to these problems is placing new incoming calls on "HOLD" when all manned stations are busy. However, when the length of an incoming call queue does not permit an answer to a call in a timely manner, as determined by the patience of a potential customer, that customer may become irritated and hang-up, representing what may be an important portion of a significant amount of lost business.

BRIEF SUMMARY AND OBJECTS OF THE INVENTION

This novel invention provides a system and method for solving the problems associated with limited attended answering of telephone calls during peak periods. It also provides a method for controllably and responsively spreading telephone answering activity initiated during peak periods into the periods of lesser activity while maintaining a contact with callers who might otherwise hang-up and be lost. From a system point of view, the invention uses a unique organization of commercially available equipment in combination with an inventive computer software package. The combination provides judicious automatic and unmanned intercession of telephone calls resident in an overflow "HOLD" queue, relieving a manned portion of the system from having to answer all calls during peak periods. Sufficient information is derived by automatic operation of the invention to permit manned call backs when time and equipment become available.

In addition to responsively answering calls selected from the overflow queue, the invention selectively implements later manned call placement scheduling as personnel services become available for the call backs. All information necessary to return each incoming call is made available to system personnel on a call-by-call basis.

Accordingly, it is a primary object to provide a partially manned system for timely answering and responding to a heavy load of incoming calls which are part of a peak call-level response to an advertisement without requiring an undue level of manned answering stations required no answer all of the calls manually at the time of each incoming call.

It is also a primary object to provide a partially manned system for handling a saturated calling queue which is the result of an advertisement induced heavy load of incoming calls from potential customers without losing customers due to an inordinately long time before the system answers each incoming call.

It is a fundamental object to provide a system for acquiring and storing for future use information gathered from an automatic telephone answering system in a database such as a Martel database, which is employed when a complementary manned telephone answering system is saturated, and for scheduling and implementing a call return when the manned telephone answering system is no longer saturated.

It is another fundamental object to provide a method for smoothing the workload of a telephone answering service which periodically and intermittently is called upon to respond to a peak/saturating load of incoming calls at one time and is utilized below capacity at other times.

These and other objects and features of the present invention will be apparent from the detailed description taken with reference to accompanying drawings.

DETAILED DESCRIPTION OF THE ILLUSTRATED EMBODIMENTS

Figure 1:
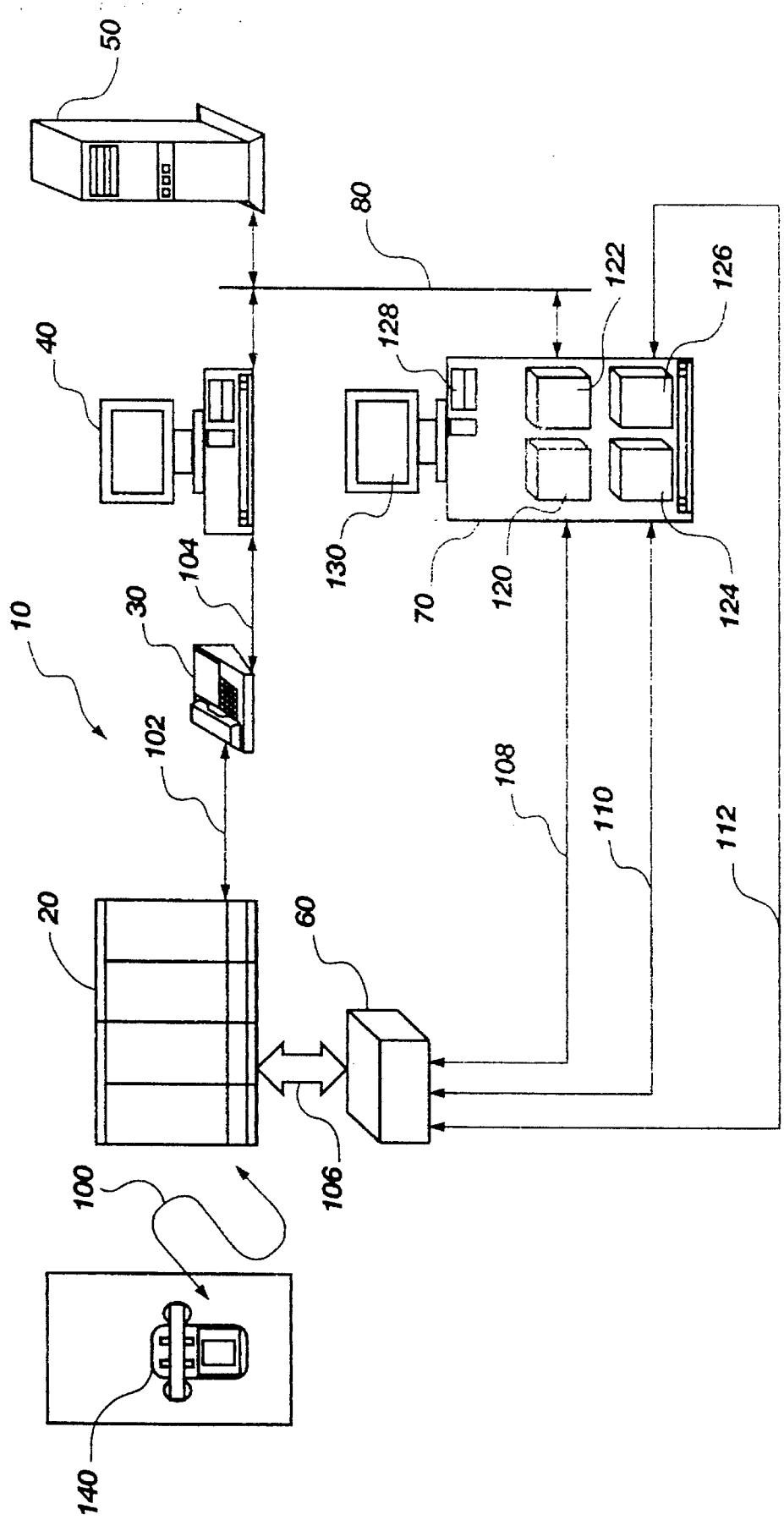
FIG. 1 is a block diagram of equipment distribution and connections used by a system which answers a selected portion of calls automatically and schedules return calls based upon total system activity.

A number of abbreviations and acronyms are commonly used herein to describe systems and processes used in this invention. The following table is furnished to provide a common understanding of the meaning of some terms used hereafter comprising abbreviations, acronyms and names:

| Abbreviation | Definition |
| --- | --- |
| ACD | Automatic Call Distribution system which routs each incoming call to an appropriate preselected Trunk Group, intercepts digital information from each incoming call and monitors call progress for generating Queue Signals. |
| ACD Telset | A telephone type device which |

| Abbreviation | Definition |
|---|---|
| | separates analog and digital information transmitted on a Digital Phone Line and presents the analog information to an ACD Telset Head/Handset and presents the digital information to an Agent Station computer in RS-232 format and multiplexes analog information from the Head/Handset and received digital information for the Agent Station onto the Digital Phone Line |
| Agent | One of a group of operators who manually perform incoming and outgoing telemarketing call servicing. |
| Analog Port | A port which supports analog signals, such as voice, DTMF tones and other audible signals; digital information like ANI and DNIS are not transmitted through the Analog Port. |
| ANI | Information in digital format comprising a phone number and area code (considered similar to Caller ID). |
| ASCII | A binary code format commonly used in digital communications. |
| Call Out Only Mode | A mode of system operation wherein only previously recorded call backs are initiated and no new calls are received. |
| Campaign | A telemarketing activity associated with advertisement of one or more products over a mass-marketing media. |
| Configuration File | A file containing a set of variable parameters required for correct system operation; examples of information contained in the Configuration File are: analog port extension assignment, DNIS to message assignment, incoming file directory paths, network login, outgoing message schedules and various timers used for system control. |
| DNIS | Information in digital format comprising a phone number and area code. |
| DTMF | Abbreviation for 'Dual Tone Multi-Frequency which comprise two of eight different frequencies used to represent the standard telephone touch pad digits "0" through "9", "#" and "*" on analog phone lines. |
| Ethernet | One standard LAN that permits transfer of data between a Network Filer Server, and Agent Station and a system computer. |
| File Server | A computer, preferably an IBM PC compatible, used to store call "index information" and data files. |
| GB | Gigabyte-one billion bytes (8 bits) of digital data. |
| HIL | A Host Interface Link comprising an RS-232 interface to a telephone line switching system which permits extensive routing control and tracking of calls and is used to intercept digital information as well as routing calls throughout a system. |
| HIL-API | Software application protocol for communicating with the HIL used in the system. |
| ID | Caller identification information. |
| Index Information | Data saved in a file for calls received on the system comprising ANI, DNIS, date and time of call. |
| I/F | An interface, usually a buffered electronic interface. |
| LAN | Local Area Network. |
| Martel | A telemarketing data management program which is installed on Agent Station computers, for detecting call back requests and prompting an Agent to check specific information contained in an associated customer voice recording, which retrieves Index Information related to the call back request while prompting the Agent to return a call, and which presents appropriate campaign information to the Agent. |
| MB | Megabyte-one million bytes (8 bits) of digital data. |
| Queue | May be used to indicate a waiting line of calls (queue) or to indicate a configurable telephone switch threshold (Queue) which is a binary signal, indicating that the total number of calls waiting to be answered has exceed the threshold or the oldest call waiting to be answered has exceed a preset time limit. |
| Queue Interface Board | An interface for a Queue monitoring computer, preferably 16 channel and optically isolated for an AT computer; each input lead should have a high and a low lead along with a current limiting resistor to protect the optical isolator. |
| Queue Signal | A signal from the Queue to the Queue Interfact Board, at least one Queue/Queue Signal is used per Trunk Group. |
| Real Time Port Status | A display of the status of each Trunk Group and each analog port assigned to that Trunk Group, the display being active and displaying such status information as off hook, play, record, on hook, call waiting, etc. |
| Receive Only Mode | A system mode of operation permitting the system to automatically answer calls independent of the status of the Queue wherein all incoming calls are stored until the system is returned to a normal operating mode or a "Call out only mode". |
| RS-232 | A communications protocol well understood by those who are skilled in the computer communications art. Generally, the RS-232 is used for a digital data path between an ACD Telset and an Agent station or, alternatively, between an ACD system and an automatic answering and call recording system. |
| Trunk Group | A group of Agents which is assigned to receive incoming telemarketing phone calls based upon a selected DNIS associated with a specific campaign; a particular Trunk Group may deal with multiple campaigns. |
| Voice Board/Modem | A voice board, preferably an NV800 or equivalent Voice Board, which has analog ports which connect to an ACD system, which can generate and detect DTMF tones and other analog phone control signals like off-hook, busy, etc., and which can record and play back analog voice |

| Abbreviation | Definition |
|---|---|
| | messages used to (1) receive incoming customer calls, (2) play a message to a caller, (3) record a message from the caller, (4) initiate a call to a specific Trunk Group, and (5) play the recorded message to an answering Agent in the specified Trunk Group. |
| Voice Mail Card | A voice mail system which may, for example, be an AVA-B series 1 voice mail card used to record a caller's name and/or other information used for playback during an outbound return call. |
| WIL | An automatic call answering, recording and return call interface link. |
| WIL Phone Line | A combined voice and data link generally used between an ACD contol system and an automatic answering, recording and return call scheduling system. |

Reference is new made to the embodiments illustrated in FIGS. 1–12 wherein like numerals are used to designate like parts throughout. One embodiment of a partially manned system 10 of the invention is seen in FIG. 1. In this inventive embodiment, system 10 comprises an ACD switching system 20, at least one Agent telephone ACD Telset 30, an Agent personal processor station 40, an Agent (not shown), a file server 50, a Voiceframe™ ACD system 60 and an automatic phone call answering and scheduling system 70. Of course, a plurality of Telsets 30, processor stations 40, and Agents are commonly used in system 10.

As seen in FIG. 1, incoming calls (and outgoing calls) are transmitted over a standard communications network 100 which connects directly to ACD switching system 20. ACD switching system 20 is in two way communication with ACD Telset 30 via a digital phone line 102. A two-way serial path 104 interconnects ACD Telset 30 and processor 40. Processor 40, file server 50 and answering and scheduling system 70 are commonly interconnected by Ethernet line connections 80, which may be any one of industry standard Ethernet connection standards and which are commercially available and well known in the art of digital communications.

System 20 comprises two-way communication with Voiceframe™ ACD system 60 via a data link 106 which is a proprietary link for communication between system 20 and voice frame automatic call distribution (ACD). Three modes of two-way communication are distributed over communication lines 108, 110 and 112. Line 108 transmits RS-232 signals. Line 110 is an analog (DTMF) phone line communication link which passes voice and DTMF signals between Voiceframe™ system 60 (ACD system) and a scheduling system 70. Line 12 is a Queue Signal carrier. A more detailed description of methods and modes of use of the system of FIG. 1 is provided hereafter.

Switching system 20 is preferably a Harris 20/20 Switch available from Harris company. Voiceframe ACD system 60 is preferably a Harris Voiceframe™ ACD system also obtainable from Harris. Telephone ACD Telset 30 is preferably an ACD Telset which is procurable from Harris.

Processor 40 is preferably an IBM compatible 386-SX-20 with a bootable Ethernet adapter or a 40 MB hard drive, a VGA display, a 101 keyboard and an ethernet adapter. All parts of processor 40 are currently commercially available.

In a preferred configuration, system 70 comprises an 8048DX2-66, full featured ISA processor single board computer with CPU, DRAM, floppy IDE controller, two serial and one parallel port (preferably ICS SB486T2C/66), a 10 slot chassis with a passive backplane, a 200 watt power supply (preferably ICS 16ISO), an SVGA video board (preferably Paradise SVGA1MB), SCSI interface board (preferably 1542C) a 520 megabyte SCSI hard drive (preferably Fujitsu M2624FA), a communications net interface board (preferably SMC EtherCard, by Ethernet, Elite 16C Ultra) and a computer voice board (preferably New voice NV800). As is well understood by those skilled in the art, more up-to-date and advanced components may be used as such become available.

File server 50 is preferably a Novell File Server comprising an IBM compatible 486-66 with a one GB hard drive, a VGA adapter, a 101 keyboard and an Ethernet adapter. It is preferable that file server 50 be compatible with commercial telemarketing software or equivalent. Martel telemarketing software is currently the preferred software package.

Answering and scheduling system 70 comprises an RS-232 interface 120, an Ethernet adapter 122, a multiple port voice modem 124, a Queue interface 125, a processor 128 and a digital display 130. Processor 128 preferably comprises an IBM compatible 486-66 board passive motherboard SCSI hard drive, a VGA adapter, a 101 keyboard, capacity for up to four voice boards for multiple port voice modem 124, Queue interface 126, a quad RS-232 serial board for interface 120, an opto-interface board and Ethernet adapter 126. The opto-interface board is used in the Queue interface 126, but is not shown in FIG. 1 although such uses are well known and understood by those skilled in the communications art.

Incoming calls are from standard telephones, generally designated as 140 and are made from some location remote from the system. A general system activity information flow diagram 200 is provided in FIG. 2. Generally, each call, and resulting subsequent action, is initiated by a customer activity designated by block 210. Generally callers, responding to an advertisement, place calls to an 800 telephone number. Each received call is delivered by standard communications network 100 to a particular inbound trunk group via switching system 20.

In combination, systems 20 and 60 deliver calls to a telemarketing group (not shown, but understood to service a plurality of Agent sets 30 and stations 40). Generally, one Trunk Group of a number of such groups may be selected to service calls for a particular advertisement campaign. As the number of calls build and as the totality of available Agents from the selected Trunk Group becomes busy, a first-in-first-out queue is established. However, as the size of the first-in-first-out queue increases, there is an ever increasing likelihood that incoming callers (customers) will lose patience and hang-up. It is especially for this circumstance that this novel invention switches by action of function blocks 214 and 214' to a second mode of operation when the number of calls in the queue exceeds a predetermined number or when calls have been in the queue a maximum period of time. (Such time may be preset or manually set by a system administrator.)

Figure 2:
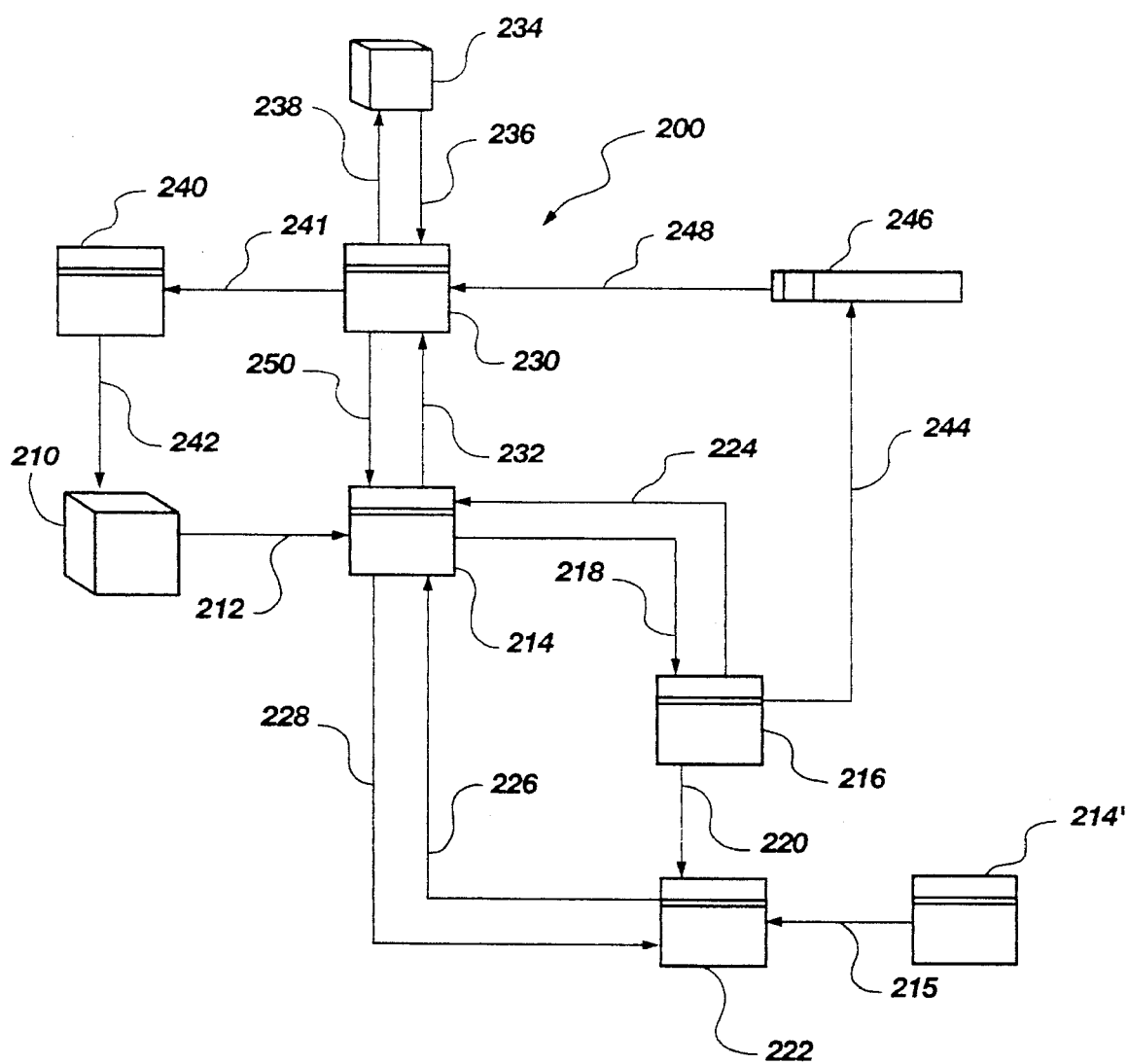
FIG. 2 is a general signal flow diagram showing communication links within the system.

The second mode of operation is initiated by an out-of-band Queue Signal sent on line 112 from Voiceframe™ ACD system 60 to answering and scheduling system 70 in FIG. 2, function line 215 is seen to transmit a Queue Signal from Queue initiating block 214' which is an inherent function of Voiceframe™ ACD system 60. The out-of-band Queue Signal may be generated by exceeding a preset number of calls in an incoming call queue or by a predetermined delay in answering an incoming call. Upon initiation of the second mode of operation, a voice mail system controlled by function of block 126 automatically responds, after receiving digital HIL-overflow digital information with ANI, as indicated by function line 218.

A function of block 126 prepares an index which is transmitted via function line 220 to interface block 222 and simultaneously sends an HIL-overflow routing and Agent call control signal to ACD control block 214 via function line 224.

The voice mail system programmed by processor 128 plays a message, based upon the advertising campaign serviced by the selected telemarketing group (Trunk Group), a called number (DNIS) and time of day, prompting the caller via function line 226 to leave a name and informing the caller that the call will be returned. The caller is given the option of leaving a name. If the caller elects to leave his name, a subsequent voice recording is transmitted via function line 228 back to interface 222, whereby an incoming analog signal of the voice is recorded in system 70 along with its index (ANI, DNIS and time of call). Generally, each recorded message comprises sufficient information to return the call and generally comprises the called number (DNIS), time of day, caller number (either by voice or by DTMF tones and optionally the name of the caller).

Another mode of operation of Voiceframe™ ACD system 60 is to drop the Queue Signal which is indicated by the function of block 214'. If the Queue Signal for a particular Trunk Group is dropped, for longer than another preset or administrator set minimum time, processor 128 is programmed to check a first-in first-out data base file for a next in line outbound message file for the particular Trunk Group.

To service the next-in-line message, an outbound call is set up through function block 216 and function line 224 and function block 230 through function line 232. Function block 230 is a function of processor 40 which, responsive to an Agent's availability (as indicated by function block 234) processes a callback through function line 236. Manual input and output interfacing functions between the Agent and block 230 are designated by function lines 236 and 238, respectively.

Another function of Voiceframe™ ACD system 60, in conjunction with switching system 20, routes the callback to the customer of the next in line message as a result of operation of function block 240, having received a call instigating signal from block 230 via function line 241. In this manner, a new customer activity is generated as indicated by function line 242 to block 210 as the customer receives the callback and is manually serviced by the available Agent.

As part of the placement of an outbound call, processor 128 assigns a next available analog port to the selected Trunk Group. Processor 128 opens and stores into a new temporary file index information for file server 50. See function line 244 and function block 246. Operation of file server 50 communicates index information to each Agent station 40 via function line 248 thereby passing index information of the outbound call thereto.

Per this activity, the first available Agent station 40 receives the call back initiating signal via function line 248. The operating mode, of station 40 is changed to outbound mode a programmed function of which retrieves the temporary file with the index information for the outbound call. ANI and DNIS information related to the outbound call is displayed on the Agent station 40 digital display screen.

Processor 128 programmably controls a replay of the rebound call customer's earlier recorded voice message after the Agent manning station 40 is on line. The Agent verifies the ANI information and updates a database kept within memory in Agent station 40. Should the responding Agent desire, a recorded voice message may be replayed as an option. Also, a save command for the voice message is available. Upon a manual action by the Agent, such as selecting and depressing a predetermined keystroke, the outbound call is placed.

By voice communications, the Agent acts to complete a call to the outbound call customer. When the outbound call action is completed, the Agent at station 40 updates a Martel database programmed within the processor in station 40. That action complete, the Agent awaits a next task. A recording of Agent activity during the outbound call is transmitted via function line 250 to the processing of block 214.

Should the Queue Signal for the Trunk Group remain dropped and additional call backs remain in the processor 128 file, processor 128 again checks the first-in first-out data base file for a next in line outbound message file for the particular Trunk Group. As disclosed above, the next-in-line message is initiated by processor 128 and serviced by a next selected available Agent.

Characteristically, when calls in the queue continue to exceed the maximum number of calls permitted in the incoming call waiting queue or the time an incoming call has been waiting to be answered, processor 128 discontinues call backs and returns to servicing incoming calls. Otherwise, processor 128 continues to recheck the first-in first out data base file for next in line outbound messages and system 10 continues to service customers with outbound calls until no calls remain in the first-in first out file. The continuation of initiating outbound calls may be overridden by a supervisors action. It may be common for overriding action by the supervisor to occur at the end of a service day.

When system 10 is unmanned or otherwise manual service is disrupted for a selected Trunk Group, a supervisor may elect to put system 10 in a receive only mode for any Trunk Group. In this case, all received calls are serviced with a voice message and recall files are recorded as disclosed above for an over threshold or over answering capacity situation. Calls received in the receive only mode are processed as first-in first-out recorded calls when manual service is resumed or when the Trunk Group is returned to the call back mode. No signals are sent to station 40 while system 10 is in the receive only mode.

Protected by password control, any agent may edit a processor 128 configuration file that is stored in file server 50 via Agent station 40. The configuration file comprises programmably administered tables which control system 70 port assignments, correlate outgoing messages with Trunk Groups and time of day. Via processor 128, changes in the configuration file are monitored (over the ethernet) and changes are implemented when detected.

In addition, processor 128 comprises a configuration file may be edited at station 70. Station 70 comprises voice boards and an associated microphone/handset which are readily commercially available. The voice boards and microphone/handset are used for generating and changing recorded audio messages for automatic communications with callers.

Processor 128 comprises a set of real time functions which permit manual Queue override, send and receive enable, save and replay voice messages and real time port status display on display 130. A graceful system 10 shutdown is also programmed into processor 128 for saving critical data during emergency and manual shutdown.

Processor 128 also comprises a file clean-up and initialization program which may be used periodically, when system 10 is off-line, to purge old data and other records which are no longer useful.

Each Agent station 40 and processor 128 each comprise specialized software (programs) which permit coordinated service among a plurality of selected agent stations and processor 128 to incoming and outbound calls.

Software for system 10 may be considered to be divided between Agent station 40 and system 70 programs. Generally system 70 comprises programs which perform the following functions:

1. Logging onto and off from HIL lines.

2. Periodically polling file server 50 for configuration update information.

3. Addressing Queue interface and HIL port per selected Trunk Group (system 70 preferably has at least one Queue interface and one HIL port connection per Trunk Group and interfaces to at least four HIL lines).

4. Addressing and selecting each interconnected analog port assigned to a specific Trunk Group (there are preferably a maximum of at least 32 addressable analog ports).

5. Monitoring Queue lines, answering overflow calls when a Queue Signal is high and initiating call backs when the Queue Signal is low.

5. Recording incoming calls comprising the following functions:

(a) Readying an HIL line when an analog port is available for answering a next incoming call.

(b) Capturing and recording ANI and DNIS information from the incoming call when a capturing and recording mode is configured and available.

(c) Transferring an incoming call to an available HIL port.

(d) Prompting a caller (whose call has been automatically answered) by playing an outgoing message based on Trunk Group, DNIS, ANI and time of day to proved specific information for on-line recording. Where ANI is not available, further prompting the caller to enter the calling phone number using a couch tone keypad, the DTMF tones are decoded and substituted for ANI in an index file.

(e) Storing caller's voice message on hard disk indexed to other HIL information acquired with each call.

(f) Configuring voice message time, such as a typical thirty second period.

(g) Limiting stored voice message information to messages to lengths of time greater than three seconds. If a message is less than three seconds, deleting the voice message and storing only index information separately.

7. Initiating and programming a call-back mode of operation comprising the following functions:

(a) Initiating any call backs remaining to be answered in a stored file for a particular Trunk Group when the Queue Signal for the Trunk Group indicates no incoming activity for a preset period.

(b) Addressing for use a first available analog port and connecting the Trunk Group extension for each next call to be serviced.

(c) Opening a temporary ASCII text file and causing the text file to be stored on file server 50. The text file comprises ANI, DNIS and reference time for the next call to be placed. This file also comprises a reference to a selected analog port which is to be used.

(d) Detecting a "play tone" sent by an Agent station 40 when the station detects a call request generated by system 70.

(e) Responding to the "play tone" by playing a recorded message associated with the call in progress.

(f) Monitoring information sent by connected station 40 per function line 250 and repeating or saving a message as requested by an Agent operating connected station 40.

(g) Monitoring the connected station 40 for customer line disconnect and thereafter deleting any recorded message and index information from memory and recording any call tracking and billing files upon completion of the call.

(h) When in the automatic call back processing mode, periodically checking Queue status per function line 215. If the Queue Signal goes high, completing processing of all calls in progress, but issuing no new calls and returning system 70 operation no a call receiving, servicing and processing mode.

8. Maintaining a configuration file comprising the following functions:

(a) Storing the configuration file on file server 50.

(b) Computing a file identification based upon the first HIL extension on system 70.

(c) Establishing and decoding a security system for changing the configuration file, preferably comprising at least three levels of security (passwords).

(d) Setting up port and Trunk Group assignments, outgoing message Trunk Group and time schedule assignments.

(e) Periodically scanning contents of file server 50 for updated configuration files.

(f) Implementing changes as required by information in updated configuration files stored on file server 50. (it is preferable to implement such changes within 1–2 minutes maximum.)

9. Providing a set of on-line, real time operations comprising the following functions:

(a) Gracefully (without losing data or inappropriately ending telephone calls) shutting down system 10.

(b) Placing system 70 in a receive only mode.

(c) Placing system 70 in a call out only mode.

(d) Displaying analog port status.

(e) Monitoring hard disk space available for additional storage and putting out an alarm for manual intervention when disk space reaches a preset limit.

10. Providing a set of off-line operations for system 10 comprising the following functions:

(a) Editing configuration files.

(b) Recording outgoing messages from local phone handsets.

(c) Issuing "HELP" screens to manual operators of system 70.

(d) Generating reports comprising statistical reports, billing reports, system 10 status reports, etc.

(e) Providing a manual cleanup routine which permits purging files of old and useless information periodically as well as checking and correcting existing file information.

Software for Agent station 40 preferably comprises software similar to Martel software and programs the following functions:

1. Responding to analog calls and, based upon an analog extension, switching to an outbound mode of operation.

2. Retrieving a predetermined set of call information from file server 50.

3. Displaying pertinent call information (ANI, DNIS, etc.)

4. Sending the "play tone" to system 70.

5. Receiving an incoming voice message.

6. Prompting the Agent operation station 40 to enter the on-line customer's name and providing editing programs for entering or correcting customer information including the recorded ANI.

7. Responding to an Agent request for a replay of a voice message (DTMF signal).

8. After receiving scheduling information from system 70, disconnecting from an analog line connected to system 70 and dialing a stored and targeted customer.

9. After connection is made to a customer via any mode, entering a customer processing program for capturing customer data for each particular mass media campaign 10. Rescheduling a call back for a later time.

11. Prompting an Agent to service a rescheduled call.

While those who are skilled in the art of communications and programming can program the above listed functions without undue effort and experimentation, a description of flow diagrams for a number of computer routines and subroutines is provided hereafter for easier implementation of system 10.

Figure 3:
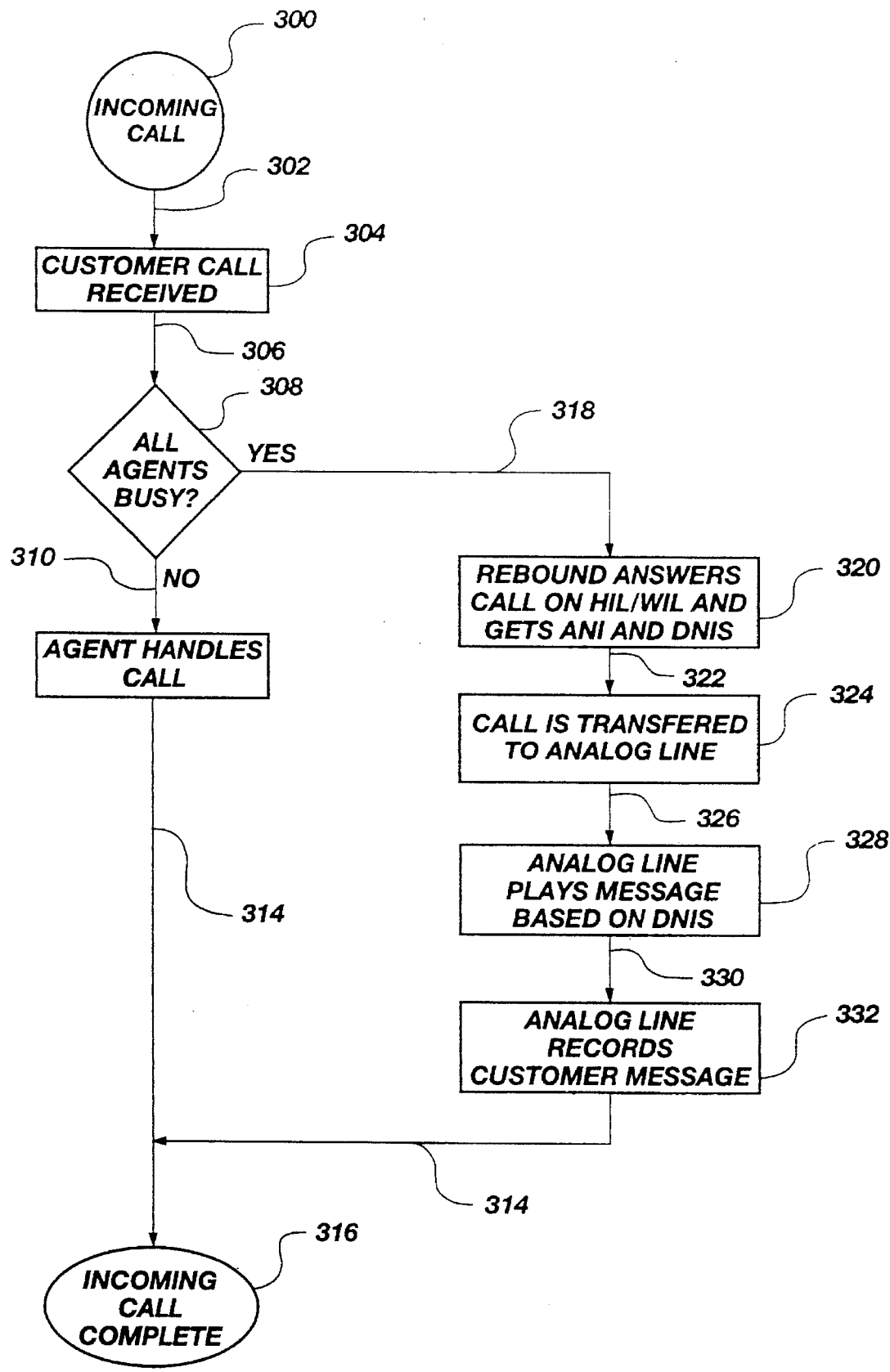
FIG. 3 is a software flow diagram showing a program sequence for handling incoming calls by the system.

Reference is made to FIG. 3 wherein an exemplary flow diagram for generally processing incoming calls is provided. Detection of an incoming call 300 is followed by action along flow line 302 to acknowledgement of call 300 by call received block 304. After acknowledgement action flow line 306 traces to decision block 308 wherein a decision is made based upon status of Agent activity. If at least one Agent is free, action flows through line 310 to a selected free Agent station 40. The selected Agent manually processes the incoming call directed to station 40 and completes the call as indicated by line 314 and sequence completing block 316.

Should all available Agents be found to be busy at decision block 308, logic flow along line 318 causes system 70 to answer the call on HIL/WIL acquiring ANI and DNIS as indicated in function block 320 when a customer has been kept on "HOLD" for too long a time as earlier disclosed. After completing activity of block 320, the next logical step connected by line 322 transfers the call to an analog line as indicated in block 324. In the next logic sequence, indicated by logic flow along line 326 to function block 328, system 70 responsively sequences an automatic set of communicating information and requests of the calling customer based upon DNIS. The next step via line 330 occurs at function block 332 whereat the calling customer's response is recorded to establish a call back record. Logic flow is then directed to line 314 to function block 316 to complete the automatic answer of incoming call 300.

Figure 4:
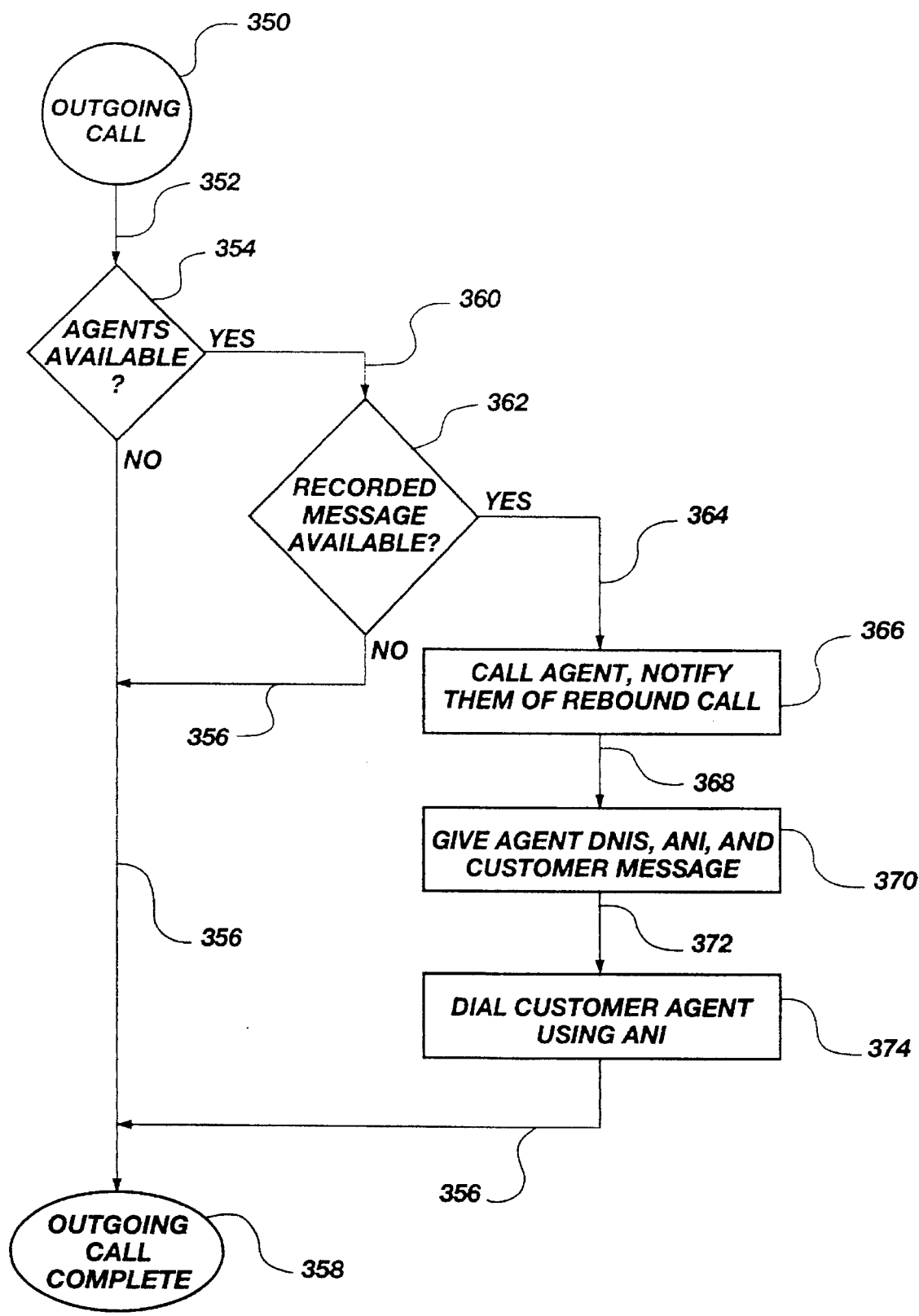
FIG. 4 is a software flow diagram showing a program sequence for handling outgoing calls by the system.

Program flow for outgoing call logic as controlled by system 70 is seen in FIG. 4. To establish an outgoing call 350 the first logic step as indicated by line 352 is a periodic test for a free Agent, as indicated in decision block 354. If no Agent is available, the next step is to follow line 356 to function block 358 whereat other system 70 functions are serviced with a rescheduled return to test for an outgoing call opportunity at a later time when the program again returns to block 250 to attempt to return the same call.

If an Agent is available, at block 354, line 360 is taken to decision block 362. A test is made to determine whether or not an answerable message is available. If not, line 356 is followed to block 358 as described before. If so, line 364 is followed to block 366 which alerts a selected available Agent of an outbound call to be made. Next, per line 368, the Agent is provided DNIS, ANI and customer message information preparatory to dialing the customer.

Following line 372 to function block 374, the customer call is completed per predetermined campaign protocol is followed to complete the customer interface and line 356 is followed to block 358 where the file recording call back information is appropriately updated.

Figure 5:
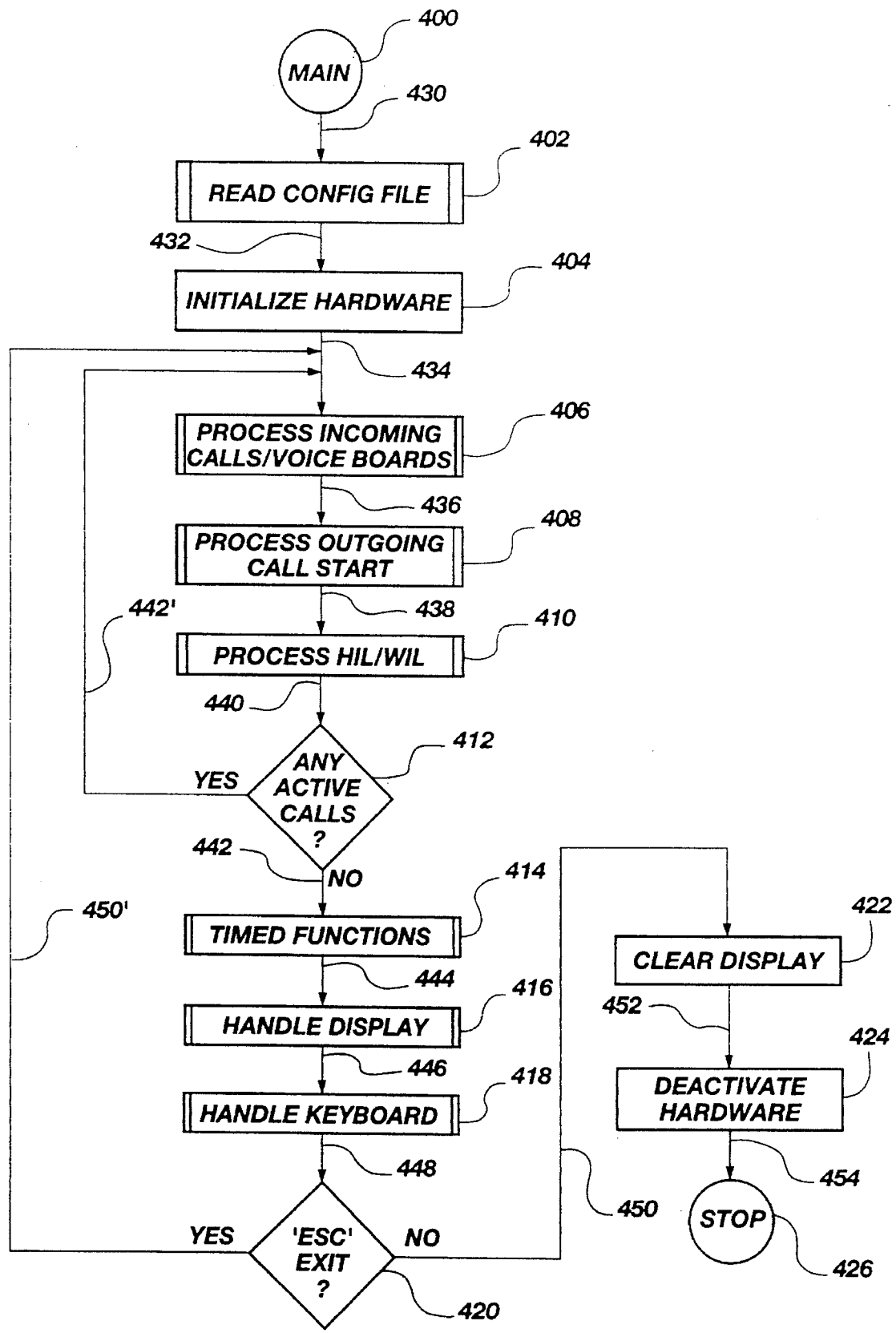
FIG. 5 is a software flow diagram of a main controlling program of the system.

A flow diagram for the system 70 main program 400 which provides software control of system 10 operation is seen in FIG. 5. Main program 400 comprises a read configuration subroutine 402, a hardware initialization routine 404, an incoming call processing subroutine 406, an outgoing call originating subroutine 408, a subroutine 410 which processes HIL/WIL interface information, a decision block 412, a timed function monitoring subroutine 414, a display 130 handling subroutine 416, a keyboard handling subroutine 418, a second decision block 420, a clear display 130 routine 422, a deactivate hardware block 424 and an end of routine return to operating system block 426. The blocks are interconnected by logic paths 430, 432, 434, 436, 438, 440, 442, 442', 444, 446, 448, 450, 450', 452 and 454 as seen in FIG. 5.

Figure 6:
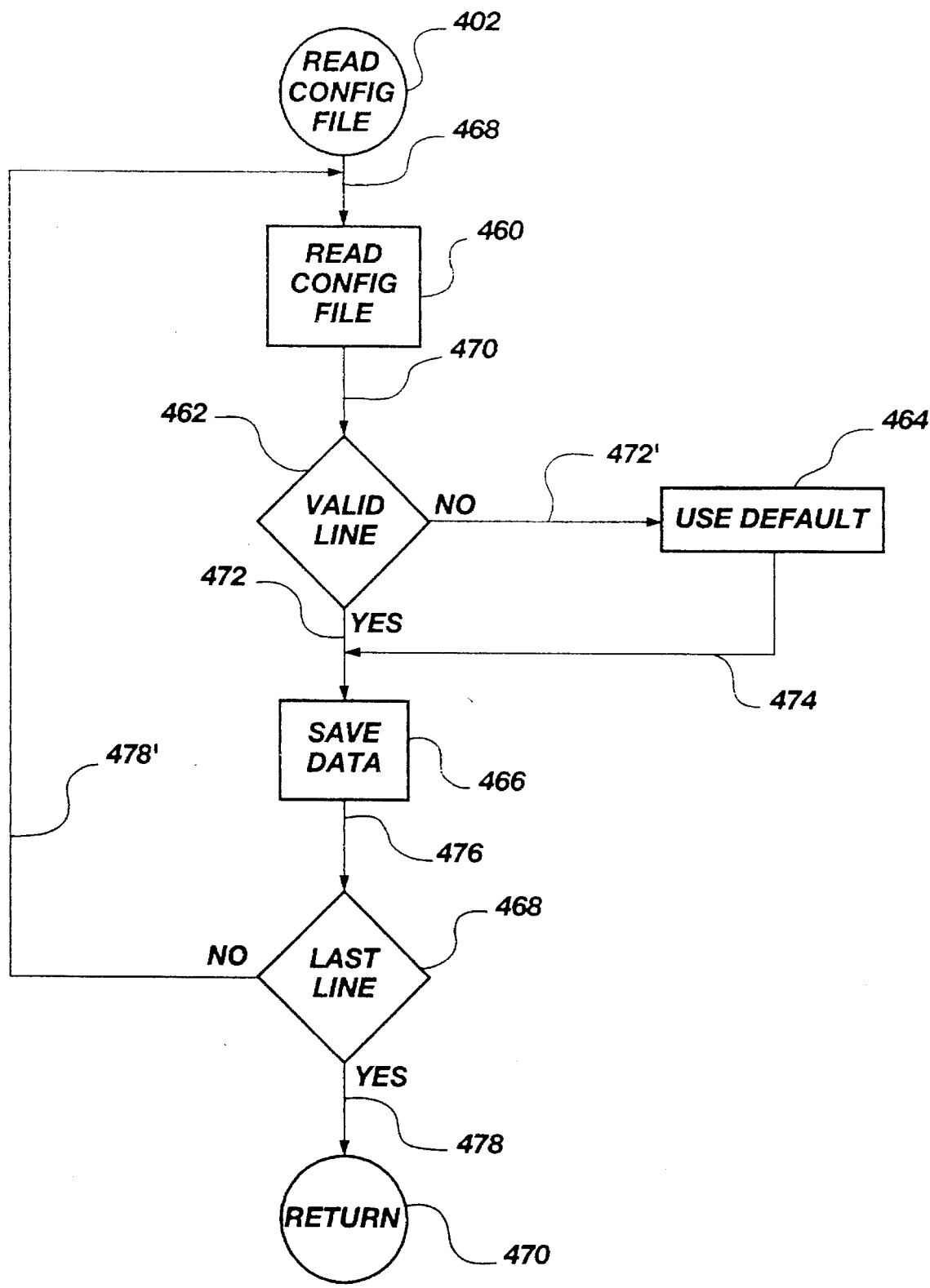
FIG. 6 is a software flow diagram for a subroutine which is used to read a configuration file.

Entry into main program 400 from processor 128 operating system sequences first along logic line 430 to a read configuration file subroutine 402. Logic flow for subroutine 402 is seen in FIG. 6. Subroutine 402 comprises a read configuration line block 460, a decision block 462, a default selection block 464, a data save routine 466, a test for end-of-subroutine decision block 468 and an exit subroutine block 470. Logic flow among between blocks and routines are by interconnecting logic paths 468, 470, 472, 472', 474, 476, 478, 478' and 480 as seen in FIG. 6.

Upon first entry to subroutine 402, a first configuration line of data is accessed from file server 50. At decision block 462, data in the accessed line of data is checked and, if the data is incomplete, alternate logic path 472' permits substitution of default information in the line of data whereby succeeding logic flow proceeds to a save data routine 466 via either logic path 472 or 474. Data is saved in a file in processor 128 for future reference. Decision block 468 tests for the last line of available configurations. If the line just read is not the last line, flow path 418' is taken to reenter block 460 to acquire and process another configuration line. If the line just read is the last available configuration line, flow proceeds to end-of-subroutine block 470 via flow path 478.

Once the configuration file has been completed by subroutine 402, main program 400 proceeds to block 404 whereupon all hardware associated with system 70 is initialized. Such programs are well known in the art and are not dealt with further herein.

Figure 12A:
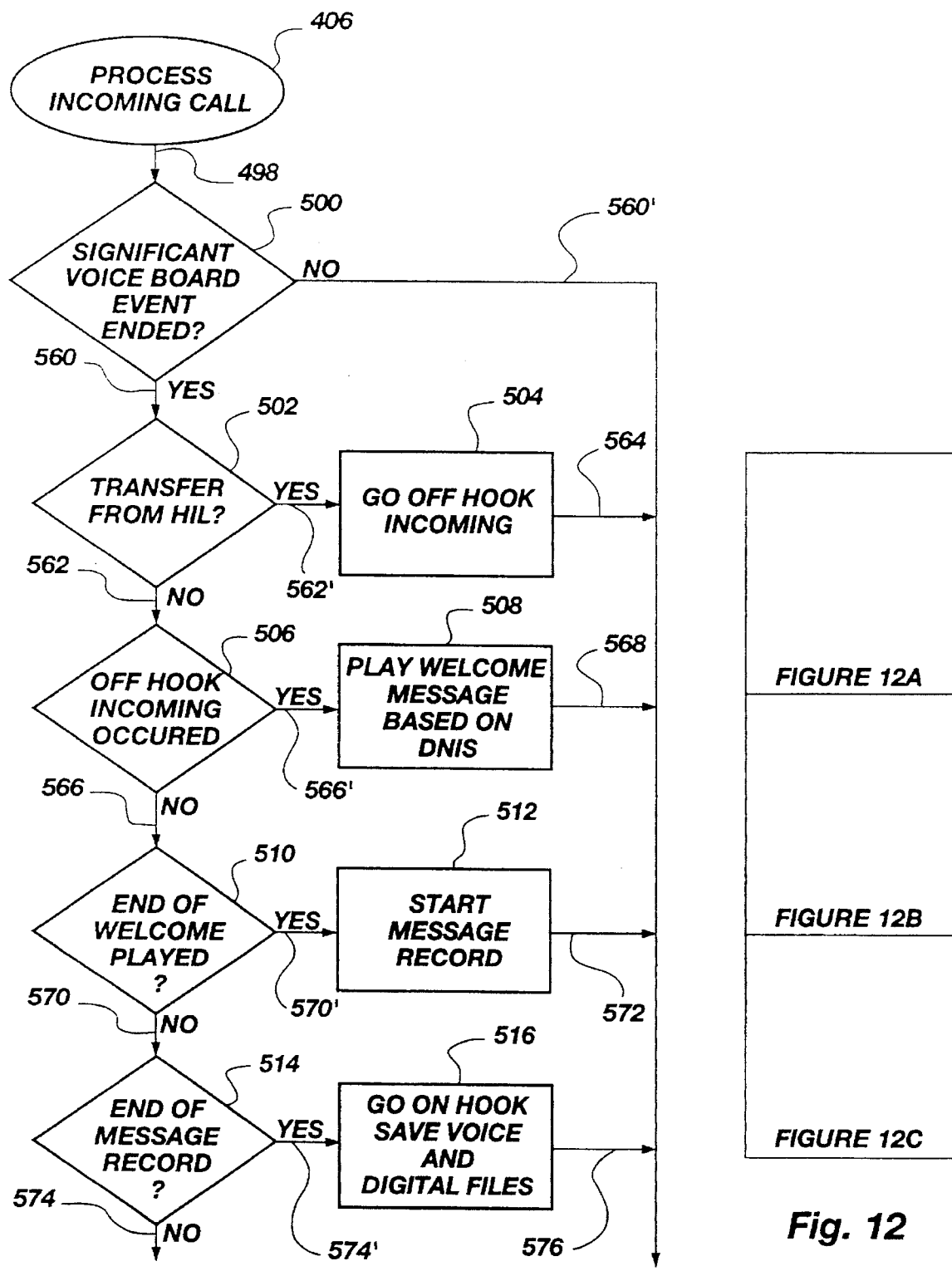
FIG. 12 (divided among FIGS. 12A, 12B and 12C) is a software flow diagram for a subroutine which processes incoming calls including control of a voice board.
Figure 12B:
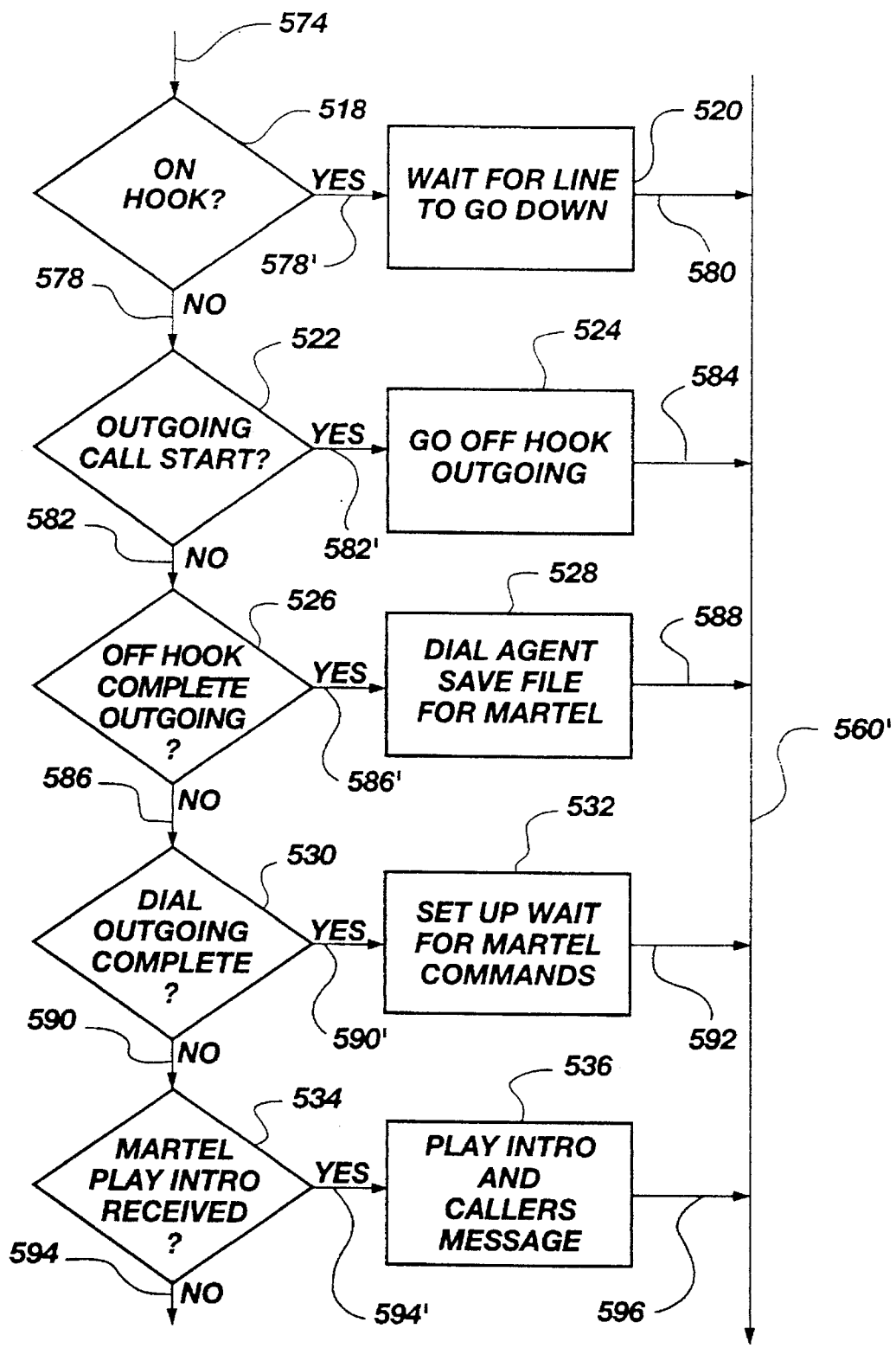
Figure 12C:
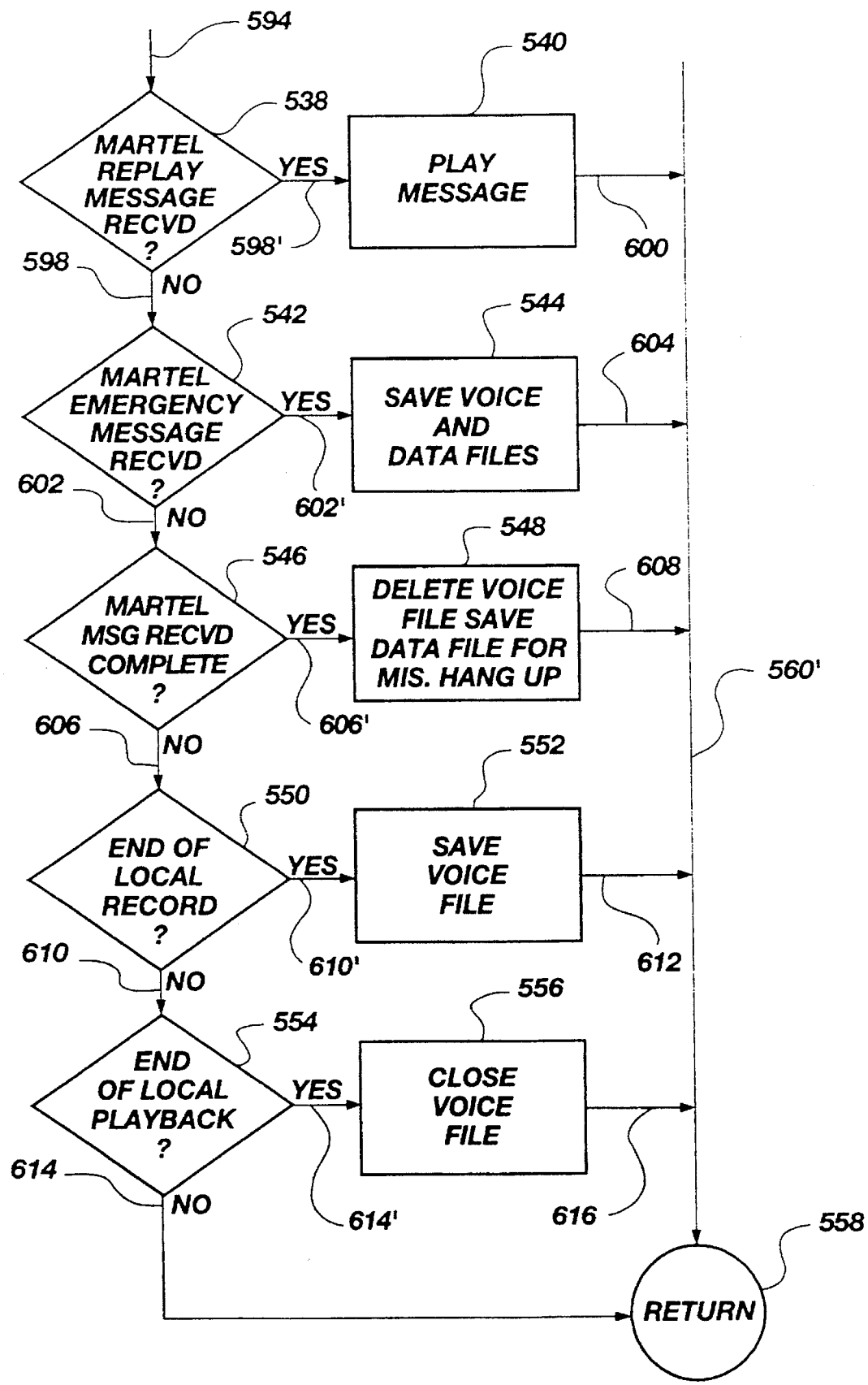

After hardware initialization, subroutine 406 is entered via path 434 to begin incoming call processing. As seen in FIG. 12 (FIGS. 12A, 12B and 12C), the important aspects of processing an incoming call comprise a series of decision blocks followed, when decisions are appropriate, by consequential system 70 control functions. Subroutine 406 comprises flow logic blocks comprising last call complete decision 500, interface transfer decision 502, go "off hook" 504, incoming has occurred decision 506, play message 508, end of message decision 510, start recording 512, end of recording decision 514, go on hook 516, "on hook" decision 518, wait block 520, start outgoing call decision 522, take hook off 524, "off hook" sequence complete decision 526, dial agent 528, outgoing dialing complete decision 530, setup wait for Martel 532, Martel received decision 534, play intro and callers message 536, Martel replay and message received decision 538, play message 540, Martel emergency message received decision 542, save voice and data files 544, Martel message complete decision 546, delete voice file and save data 548, end of local record decision 550, save voice file 552, end of local playback decision 554, close voice file 556 and subroutine routine 558. The decision and function blocks are interconnected by logic paths 498, 560, 560', 562, 562, 564, 566, 566', 568, 570, 570', 572, 574, 574', 576, 578, 578', 580, 582, 582', 584, 586, 586', 588, 590, 590', 592, 594, 594', 596, 598, 598', 600, 602, 602', 604, 606, 606', 608, 610, 610', 612, 614, 614' and 616 as seen in FIGS. 12A, 12B and 12C. Note interconnecting paths (574 from FIG. 12A to FIG. 12B and 594 from FIG. 12B to FIG. 12C; also common flow path 560' on each FIG. 12A–C).

First decision block 500 of subroutine 406 tests to see if the last significant call event on the selected Trunk Group line has ended. If not, logic path 560' is taken to subroutine exit 558. Otherwise, a second decision block is entered via path 560 where a test is made for a transfer via the HIL. If yes, the connected line is commanded to be taken "off hook" via path 562' and logic block 504 to begin processing of an incoming. Once the processing has begun subroutine is exited via paths 564 and 560'.

If there is not transfer from HIL, a test is made in decision block 506 to determine whether or not connected line is "off hook". If yes, a command to play a welcome message based upon DNIS is given via block 508. Otherwise, a test is made at decision block 510 as to whether or not the end of the welcome message has occurred. If so, a command is given at block 512 to stare a message record. If not, the program continues via path 570 to decision block 514.

At decision block 514, a test is made for an end of the message record. If the end of the message record has occurred, the phone line is placed "on hook" and all voice and digital files are saved. If the end of the message record has not occurred path 514 is followed to a test to determine if the telephone is "on hook" in decision block 518 as seen in FIG. 12B. If the line signal is found to be "on hook", the path to block 520 where a wait loop for the line to go down is established. After which, path 580 and path 560' are taken to subroutine end 558.

If the line signal is not found to be "on hook", path 578 is taken to decision block 522. At decision block 522, a test is made to determine whether or not an outgoing call should be started. If yes, a command to give a command to go "off hook" is given at block 524 and subroutine 406 is exited via subroutine return 558.

If the "off hook" command of block 524 has been successfully completed, decision at block 526 leads to function block 528 via path 586'. Function block 528 causes the agent save file for Martel to be dialed. Otherwise, path 586 is taken to decision block 530 where a test is made to determine whether or not the outgoing dialing is complete. If so, a setup routine of block 532 is activated to wait for Martel commands related to the outgoing call and subroutine 406 is exited via paths 592 and 560'. If not, path 590 is taken to decision block 534.

At block 534, a test is made to determine whether or not the Martel play introductory message has been received. If so, a command is given via function block 536 to play the introductory and associated callers message. From block 536, subroutine 406 exits via return 558. If not, logic flow is to block 538 via path 594 as seen in FIG. 12C.

At block 538 a test is made to determine that a Martel message has been received by system 70. If so, the command to play the message is given via block 540 and subroutine 406 is exited via return 558. Otherwise, path 598 is taken to decision block 542.

At block 542, a test is made to determine whether or not an emergency Martel message has been received. If so, logic path 602' to function block 544 results in saving current voice and data files for later use. If not, logic path 602 is taken to decision block 546.

At block 546, a test is made to determine whether or not the Martel message received indicates the call has been completed. If so, program flow is to function block 548 where the voice file is deleted and the data file is saved for follow-up processing purposes and a hang-up command is given. If not, logic flow is to block 550 where a test is made for an end of local record. If the test for end of local record is true, the current voice file is saved per block 552 and the routine is exited. Otherwise, logic flow is via path 610 to decision block 554.

Decision block 554 is the final decision block in subroutine 406. An decision block 554, a test is made for the end of local playback. If it is the end of local playback, the voice file associated with the call is closed and subroutine 406 is exited through return 558. If the end is not detected, subroutine 406 is exited along path 614. Note than in all cases, subroutine 406 is exited via return 558, after each described function, unless otherwise specified above.

Figure 10:
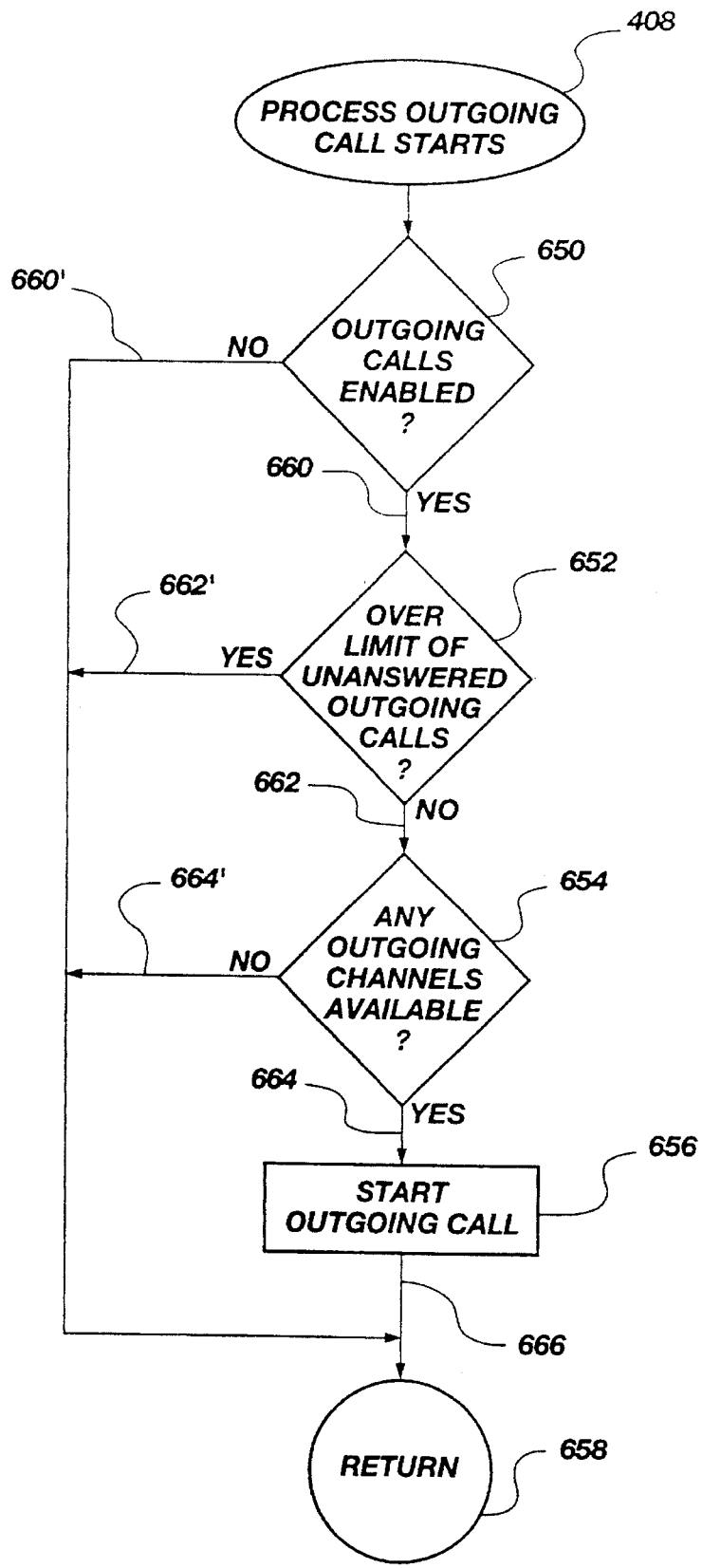
FIG. 10 is a software flow diagram for a subroutine which is used to originate each outgoing call.

Upon return from subroutine 406, subroutine 408 is called to initiate processing of outgoing calls. Reference is made to FIG. 10 wherein the program flow sequence for subroutine 408 is seen. Subroutine 408 comprises decision blocks 650, 652 and 654, function block 656 and subroutine return block 658. Blocks of subroutine 408 are interconnected by logic flow paths 660, 660', 662, 662', 664, 664' and 666 as seen in FIG. 10.

The first test in subroutine 408 by block 650 tests to determined whether or not outgoing calls have been enabled. If such has not occurred, subroutine 408 is exited via path 660'. If such has occurred, path 660 is taken to decision block 652.

A second, test, made by block 652, is to determine whether or not a limit on the number of unanswered outgoing calls has been reached. If so, subroutine 408' is exited via paths 662' and 660'. If not path 662 is taken to decision block 664 where a test is made for available outgoing Agent channels. If no outgoing Agent channels are available, paths 664' and 660' are taken to subroutine return 658. If there is an Agent channel available, path 664 is taken to function block 656 to give the command to start an outgoing call, after which path 666 is taken to return 658.

Figure 11:
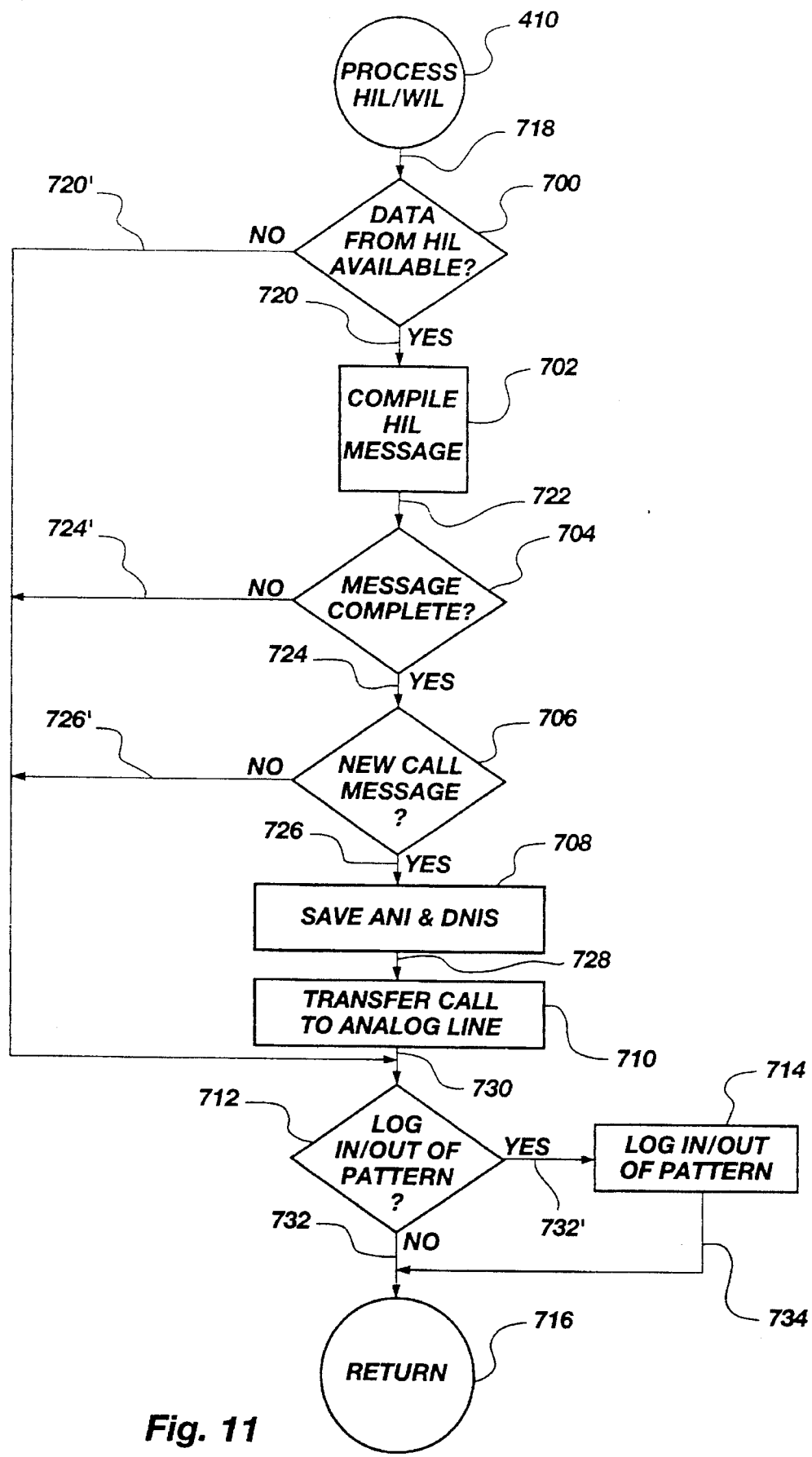
FIG. 11 is a software flow diagram for a subroutine which processes host interface link information.

From subroutine 408, path 438 is taken to subroutine 410 as seen in FIG. 5. A flow chart for subroutine 410 is seen in FIG. 11. Subroutine 410 comprises decision and function blocks 700, 702, 704, 706, 708, 710, 712, 714 and 716. The decision and function blocks of subroutine 410 are interconnected by logic flow paths 720, 720', 722, 724, 724', 726, 726', 728, 730, 732, 732' and 734.

The first function upon entry into subroutine 410 is a determination of whether or not message data is available from HIL. If the message data is not available, path 720' is taken to path 730. If data is available, compiling of at least a portion of the message data from HIL is accomplished and path 722 is taken to decision block 704.

At decision block 704, a decision is made as to whether or not the message is complete. If not, paths 724' and 720' are taken to path 730. If so, path 724 is taken to decision block 706 where a test is made to determine if a new call message is available. If a new call is not available, paths 726' and 720' are taken to the intersection with path 730. Otherwise, path 721 is take to function block 708 wherein ANI and DNIS for the new call message is saved.

After exiting function block 708, path 728 is taken to function block 710 wherein a call on a connected line is transferred to an analog line. Path 730 which exits from block 710 and the confluence of paths 720', 724' and 726' lead to the next decision block 712. At block 712, a decision of whether or not a log in is out of pattern is tested. If the log in is out of pattern, it is corrected in function block 714. Path 732 from the negative side of decision block 712 and path 734 from block 714 both lead to subroutine 410 return 716.

As seen in FIG. 5, upon return from subroutine 410, path 440 is taken to decision block 412. Decision block 412 determines whether or not there are any active calls. If there are calls active, path 442' is taken to path 434 which reenters subroutine 406 for additional processing. If there are no active calls, path 442 is taken to subroutine 414.

Figure 9:
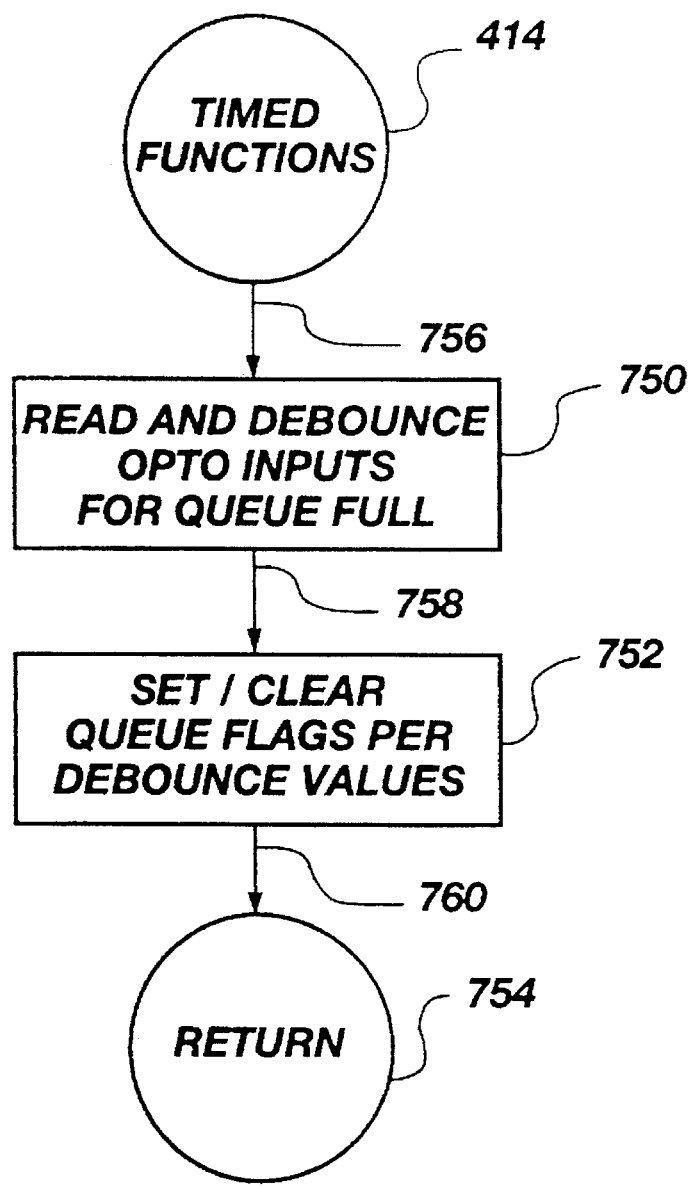
FIG. 9 is a software flow diagram for a subroutine which importantly monitors timed functions.

Subroutine 414, seen in FIG. 9, comprises two function blocks 750 and 752 and a return block 754. Upon entry to subroutine 414, a logic flow path 756 is taken to function block 750 which reads and debounces opto-electrical inputs which signal queue full. A second function block 752, reached via path 758 from block 750, sets or clears Queue flags based upon debounce information from block 750 after which path 760 is taken to subroutine 414 return 754.

Figure 7:
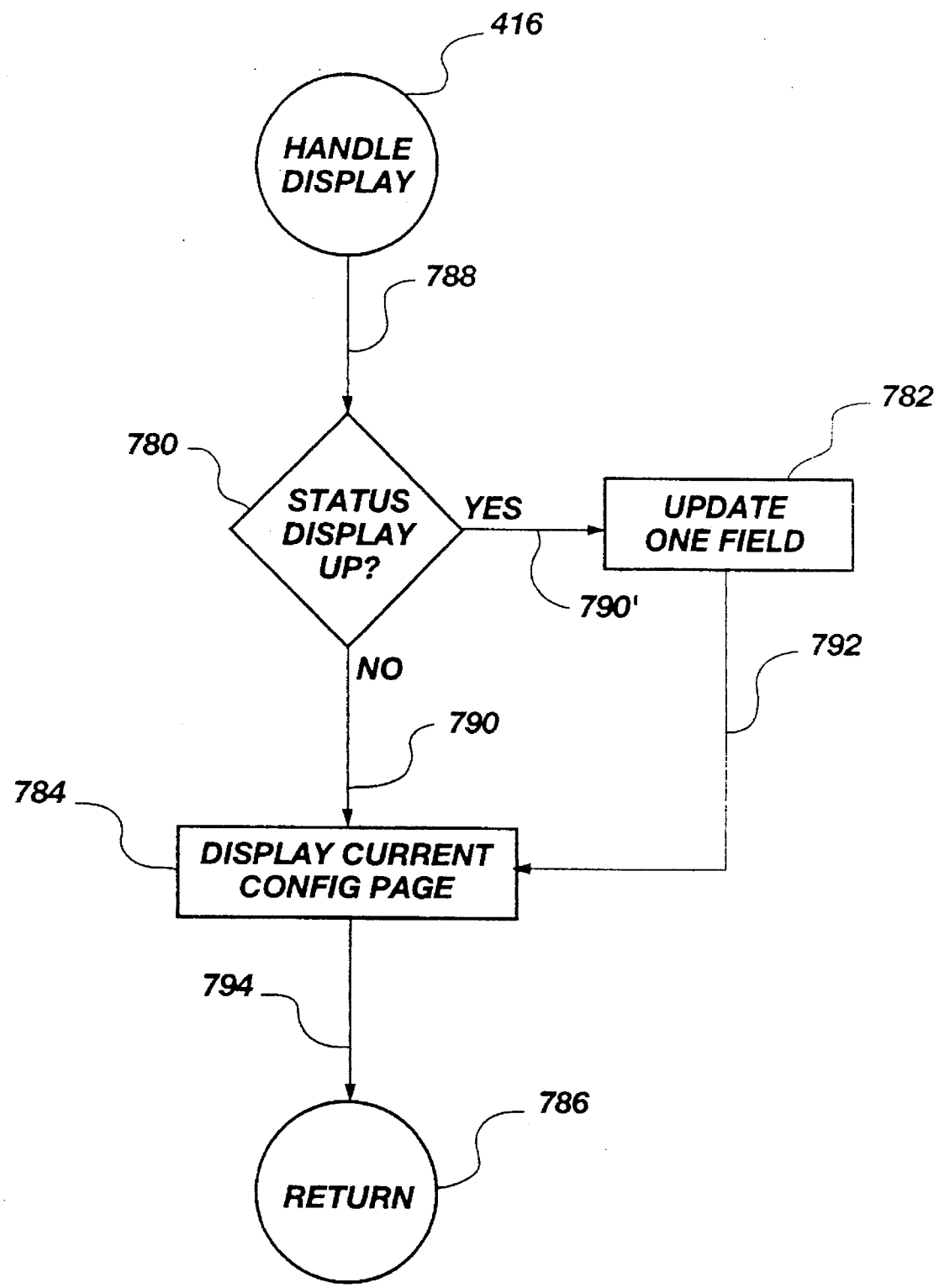
FIG. 7 is a software flow diagram for a subroutine which controls display of status.

Again referring to FIG. 5, upon return from subroutine 414, the handle display 130 subroutine 416 is entered via path 444. The flow path for subroutine 416 is seen in FIG. 7. Subroutine 416 comprises a decision block 780, two function blocks 782 and 784 and a return block 786 and logic interconnecting paths 788, 790, 790', 792 and 794.

First action upon entry to subroutine 416 is a test to determine whether or not status is being displayed. If so, logic path 790' is taken to function block 782 wherein one display field is updated. If not, a current configuration page is displayed. Upon completion of each function block 782 and 784 logic paths are taken to subroutine 416 return 786 as shown in FIG. 7.

Figure 8:
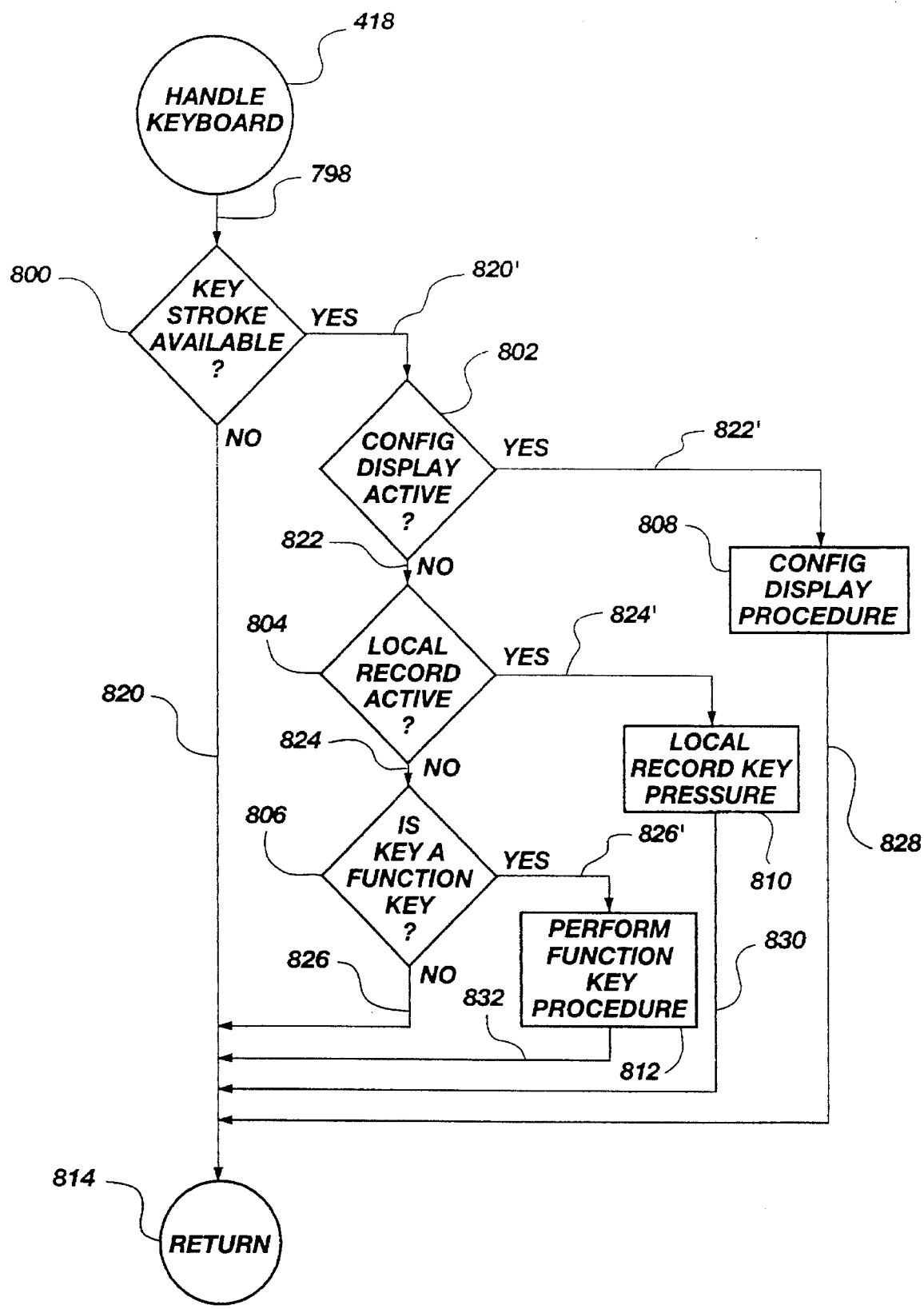
FIG. 8 is a software flow diagram for a subroutine which handles keyboard interface.

Following exit from subroutine 416 path 446 is taken to subroutine 418 as seen in FIG. 5. As seen in FIG. 8, subroutine 418 comprises four decision blocks 800, 802, 804 and 806, three function blocks 808, 810 and 812 and a return block 814. Subroutine 416 also comprises logic flow paths 798, 820, 820', 822, 822', 824, 824', 826, 826', 828, 830 and 832 which interconnect the blocks of subroutine 416 as seen in FIG. 8.

The initial entry path 798 is to a test for a key stroke. If a keystroke is not available, path 820 is taken directly to return 814 from subroutine 418. If a keystroke is available, path 820' is taken for decision block 802 whereat a determination is made whether or not the configuration display is active. If so, function block 808 is entered to display the configuration file followed by exiting subroutine 418 via path 828. If not, path 822 is taken to decision block 804.

Decision block 804 tests to determine if a local record flag is set. If so, local record key procedure block 810 is entered via path 824' to record the key stroke and subroutine 418 is exited via path 830. If not, the incoming key stroke is tested for a function key. If the key stroke is a function key, the procedure associated with the incoming function key stroke is performed and subroutine 418 is exited via path 832. If the key stroke is not a function key, path 826 is taken to return 814 to exit subroutine 418.

Subroutine 418 exits to path 448 which routs the program to decision block 420 as seen in FIG. 5. Decision block 420 tests the key stroke for an 'ESC' key stroke. If the key stroke is not 'ESC', a path 450' returns MAIN program 400 to path 434 to again resume the program at block 406, as herebefore described.

If the key stroke is 'ESC', path 450 is taken to function block 422 at which system 70 display 130 is cleared. Path 452 is then taken to function block 424 where hardware is deactivated. Both the clear display and hardware deactivation functions are program routines which are well known to those skilled in the contemporary computer programming art. After function 424 is complete path 454 is taken to stop function block 426 where the MAIN program 400 is stopped and normally operational control is returned to processor 128 operational control.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for limiting time "ON HOLD" for incoming calls to a telephone answering system which potentially receives more calls than can be answered manually at any given time, said apparatus comprising:

an ACD switching system which provides two way communication between a caller and said ACD switching system;

at least one Agent station which receives telephone call information through an ACD telset;

an ACD processing system which is in two way communication with the ACD switching system;

a system controller in communication with the ACD processing system which automatically answers incoming calls not answered by Agents and left "ON HOLD" for longer than a predetermined time, which automatically acquires necessary data for responding at a later time to calls not answered by Agents, and which initiates communication of said automatically acquired data to an Agent prior to the Agent's placement of an outgoing call corresponding to said automatically answered incoming calls at a time when said Agent is determined by said ACD processing system to be available for placing outgoing calls;

a file server for storing said automatically acquired data;

a communications link for communicating said stored data between the system controller, the ACD processing system and the Agent station.

2. Apparatus according to claim 1 wherein the system controller comprises means for manually changing the predetermined time.

3. Apparatus according to claim 1 wherein the system controller comprises means for detecting a level of apparatus operation wherein all Agent stations are busy.

4. A method for selectively processing and responding to a large volume of incoming calls all of which cannot be answered by Agents, the method comprising the steps of:

providing an Agent manned system for manually answering a number of incoming phone calls defined by the number of Agents available;

providing an automatic system for handling an overload of incoming calls which exceed the defined number of answerable incoming calls defined by the number of said Agents available;

manually answering incoming phone calls until the defined number of incoming calls which may be manually answered is exceeded;

establishing a Queue Signal which indicates that the number of incoming calls exceeds said defined number which can be manually answered;

automatically answering incoming calls not manually answered by the manned system responsive to detecting said Queue Signal such that incoming calls are not kept "ON HOLD" for an undesirable extended period;

collecting information from said automatically answered incoming calls to enable the incoming calls to be returned later as outgoing calls;

storing data from said automatically answered incoming calls for later review by an Agent prior to placement of an outgoing call relating to said stored data;

transferring said stored data to said Agent for processing by said Agent prior to said Agent placing an outgoing call relating to said stored data, said transfer of said stored data to said Agent being effected responsive to said Queue Signal indicating that the number of incoming calls has decreased below said defined number of incoming calls such that Agents are available for placing outgoing calls responsive to said stored data; and completing an outgoing call by said Agent.

5. The method according to claim 4 further comprising updating said stored data relating to an automatically answered incoming call which has been returned as an outgoing call placed by said Agent following completion of said outgoing call, and storing said updated data for later processing.

6. The method according to claim 4 further comprising overriding said Queue Signal to place said automatic system in a call out only mode to suspend processing of incoming calls.

7. The method according to claim 4 wherein said stored data collected from said incoming calls includes data derived from analog, digital and DMTF processing means.

8. A telephonic communications processing system comprising:

routing apparatus for processing incoming and outgoing telephonic transmissions, said routing apparatus further providing means for establishing a Queue Signal responsive to the existence of a predetermined number of incoming calls which cannot be answered by Agents and selectively routing incoming calls to an agent station or to an outbound message file;

an agent station in communication with said routing apparatus for receiving incoming calls and for placing outgoing calls responsive to a callback initiating signal from said outbound message file, said agent station having processor apparatus for processing and displaying information relating to said incoming calls routed to said outbound message file;

answering and scheduling apparatus in communication with said routing apparatus for notifying a caller placing an incoming call that connection to said agent station cannot be completed and for processing said incoming calls to said outbound message file, said answering and scheduling apparatus being responsive to said established Queue Signal;

a processor for processing information relating to an incoming call placed in said outbound message file, said information being received in analog, digital and dual tone multi-frequency form;

storage apparatus in communication with said processor for storing said processed information relating to an incoming call in said outbound message file, said storage apparatus being in communication with said agent station processor apparatus;

means for accessing said outbound message file responsive to modification of said Queue Signal responsive to receipt of a number of incoming calls less than said predetermined number, and for sending said callback initiating signal to said agent station; and means for retrieving from said storage apparatus said stored processed information and transferring said information to said agent station processor apparatus.

9. The telephonic communications processing system of claim 8 wherein said routing apparatus is an ACD switching system.

10. The telephonic communications processing system of claim 8 further including means for placing said routing apparatus in a receive-only mode.

11. The telephonic communications processing system of claim 8 further including means for placing said routing apparatus and processor in a call out only mode.

12. The telephonic communications processing system of claim 8 further comprising software associated with said agent station processor apparatus for retrieving data from said storage apparatus and for updating said processed information for future use.

13. The telephonic communications processing system of claim 12 wherein said agent station includes a telset and computer terminal with central processing unit.

14. The telephonic communications processing system of claim 13 wherein said answering and scheduling apparatus includes a processor having voice mail, voice board and modem capabilities.

15. The telephonic communications processing system of claim 14 wherein said storage apparatus is a file server accessible by said agent station central processing unit.

16. The telephonic communications processing system of claim 15 wherein said means for retrieving stored processed information comprises a local area network system.

17. The telephonic communications processing system of claim 16 wherein said local area network is an Ethernet system.

* * * * *

UNITED STATES PATENT AND TRADEMARK OFFICE
CERTIFICATE OF CORRECTION

PATENT NO. : 5,559,878
DATED : September 24, 1996
INVENTOR(S) : Lyle O. Keys et al.

It is certified that error appears in the above-identified patent and that said Letters Patent is hereby corrected as shown below:

In column 1, line 62, change "no" to --to--;

In column 4, line 12, change "reguests" to --requests--;

In column 4, line 35, change "Interfact" to --Interface--;

In column 5, line 23, change "new" to --now--;

In column 5, line 59, change "company" to --Company--;

In column 6, line 23, change "125" to --126--;

In column 7, line 63, delete the comma after mode;

In column 7, line 64, insert a comma after "mode";

In column 9, line 42, change "couch" to --touch--;

In column 10, line 21, change "no" to --to--;

In column 10, line 37, change "(it" to --(It--;

In column 11, line 63, change "250" to --350--;

In column 13, line 10, change "562" second occurrence to --562'--;

In column 14, line 42, change "408'" to --408--.

Signed and Sealed this

Twenty-third Day of December, 1997

Attest:

BRUCE LEHMAN

*Attesting Officer*   *Commissioner of Patents and Trademarks*